(12) United States Patent
Duan et al.

(10) Patent No.: US 10,845,485 B2
(45) Date of Patent: Nov. 24, 2020

(54) METHOD AND APPARATUS FOR GENERATING INFORMATION

(71) Applicant: Baidu Online Network Technology (Beijing) Co., Ltd., Beijing (CN)

(72) Inventors: Jianguo Duan, Beijing (CN); Yanyan Li, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/563,679

(22) Filed: Sep. 6, 2019

(65) Prior Publication Data

US 2019/0391272 A1 Dec. 26, 2019

(30) Foreign Application Priority Data

Oct. 23, 2018 (CN) .......................... 2018 1 1236242

(51) Int. Cl.
*H04W 24/00* (2009.01)
*G06Q 10/00* (2012.01)
(Continued)

(52) U.S. Cl.
CPC .............. *G01S 19/07* (2013.01); *H04W 4/021* (2013.01); *H04W 4/029* (2018.02); *G06F 17/18* (2013.01)

(58) Field of Classification Search
CPC ....... G01S 19/07; H04W 4/021; H04W 4/029; G06F 17/18
(Continued)

(56) References Cited

U.S. PATENT DOCUMENTS

2010/0042940 A1* 2/2010 Monday ................ G06F 3/0486
715/764
2013/0203377 A1* 8/2013 Nagata .................. H04W 24/08
455/405
(Continued)

FOREIGN PATENT DOCUMENTS

| CN | 105159926 A | 12/2015 |
| CN | 105357637 A | 2/2016 |
| KR | 101680983 B1 * | 11/2016 |

OTHER PUBLICATIONS

Machine translation of KR10-1680983.*

*Primary Examiner* — Rafael Pérez-Gutiérrez
*Assistant Examiner* — Mark G. Pannell
(74) *Attorney, Agent, or Firm* — Kilpatrick Townsend & Stockton LLP

(57) ABSTRACT

Disclosed are a method and apparatus for generating information. A method may include: acquiring a visiting data sequence and a positioning data sequence of a user, visiting data including visiting time and a point of interest identifier, and positioning data including positioning time and location information; using, in response to determining that the visiting time of the visiting data in the visiting data sequence matches the positioning time of the positioning data in the positioning data sequence, the visiting data corresponding to the matched visiting time as target visiting data, and the positioning data corresponding to the matched positioning time as target positioning data; determining an effective area of a target point of interest; and determining a dwell time of the user at the target point of interest based on the effective area and the positioning data sequence.

18 Claims, 6 Drawing Sheets

(51) Int. Cl.
*G01S 19/07* (2010.01)
*H04W 4/029* (2018.01)
*H04W 4/021* (2018.01)
*G06F 17/18* (2006.01)

(58) Field of Classification Search
USPC .................................................... 455/456.3
See application file for complete search history.

(56) References Cited

U.S. PATENT DOCUMENTS

| | | | |
|---|---|---|---|
| 2013/0345969 A1* | 12/2013 | Udeshi | G01C 21/26 701/461 |
| 2015/0025799 A1* | 1/2015 | Jackson | G01C 21/00 701/519 |
| 2015/0094021 A1* | 4/2015 | Su | H04W 48/04 455/411 |
| 2015/0350351 A1* | 12/2015 | Tung | H04L 67/18 709/204 |
| 2017/0187788 A1* | 6/2017 | Botea | H04L 67/1008 |
| 2018/0091940 A1* | 3/2018 | Gonzalez | G01C 21/3679 |
| 2018/0349954 A1* | 12/2018 | Mehta | G06Q 30/0261 |

\* cited by examiner

200

201 Acquiring a visiting data sequence and a positioning data sequence of a user

202 Using, in response to determining that the visiting time of the visiting data in the visiting data sequence matches the positioning time of the positioning data in the positioning data sequence, the visiting data corresponding to the matched visiting time as target visiting data, and the positioning data corresponding to the matched positioning time as target positioning data

203 Determining an effective area of a target point of interest

204 Determining a dwell time of the user at the target point of interest based on the effective area and the positioning data sequence

Acquiring a visiting data sequence and a positioning data sequence of a user

502

Using, in response to determining that the visiting time of the visiting data in the visiting data sequence matches the positioning time of the positioning data in the positioning data sequence, the visiting data corresponding to the matched visiting time as target visiting data, and the positioning data corresponding to the matched positioning time as target positioning data

503

Determining an effective area of a target point of interest

504

Determining a dwell time of the user at the target point of interest based on the effective area and the positioning data sequence

505

Generating, based on visiting data sequences and positioning data sequences of a plurality of users, dwell time of users of the plurality of users at the target point of interest to obtain a plurality of dwell time

506

Performing statistical analysis on the plurality of dwell time, and outputting statistical analysis results

Fig. 5

METHOD AND APPARATUS FOR GENERATING INFORMATION

CROSS-REFERENCE TO RELATED APPLICATIONS

This application claims priority to Chinese Patent Application No. 201811236242.5, filed on Oct. 23, 2018, titled "Method and apparatus for generating information," which is hereby incorporated by reference in its entirety.

TECHNICAL FIELD

Embodiments of the present disclosure relate to the field of computer technology, specifically to a method and apparatus for generating information.

BACKGROUND

In a user travelling scenario, the stay duration at a POI (Point of Interest) has a great influence on the user's travelling decision. For example, in a passport application scenario, by counting the average stay duration in the exit and entry administration office, it may help users to better plan their trips. As another example, for a catering scenario, by characterizing the stay duration at a particular catering POI, it may help the users to arrange time more reasonably. At this stage, the stay duration at a POI may be acquired manually. For example, for a certain POI, statistical analysis may be performed on historical stay durations of a large number of users who have visited the POI, thereby obtaining the stay duration for the POI.

SUMMARY

Embodiments of the present disclosure propose a method and apparatus for generating information.

In a first aspect, an embodiment of the present disclosure provides a method for generating information, including: acquiring a visiting data sequence and a positioning data sequence of a user, visiting data including visiting time and a point of interest identifier, and positioning data including positioning time and location information; using, in response to determining that the visiting time of the visiting data in the visiting data sequence matches the positioning time of the positioning data in the positioning data sequence, the visiting data corresponding to the matched visiting time as target visiting data, and the positioning data corresponding to the matched positioning time as target positioning data; determining an effective area of a target point of interest, the target point of interest being a point of interest corresponding to a point of interest identifier of the target visiting data; and determining a dwell time of the user at the target point of interest based on the effective area and the positioning data sequence.

In some embodiments, the method further includes: generating, based on visiting data sequences and positioning data sequences of a plurality of users, dwell time of users among the plurality of users at the target point of interest to obtain a plurality of dwell time; and performing statistical analysis on the plurality of dwell time, and outputting statistical analysis results.

In some embodiments, the determining a dwell time of the user at the target point of interest based on the effective area and the positioning data sequence, includes: determining, based on the effective area and the location information in the positioning data, a positioning data subsequence from the positioning data sequence, where positioning data in the positioning data subsequence is sorted in chronological order; performing status marking on the positioning data in the positioning data subsequence, where marked status includes start, stay, and end; and determining the dwell time of the user at the target point of interest based on positioning data with status start and positioning data with status end.

In some embodiment, the determining the dwell time of the user at the target point of interest based on positioning data with status start and positioning data with status end, includes: marking a status of a previous positioning data of the positioning data with status start in the positioning data sequence as a point before start, and marking a status of a next positioning data of the positioning data with status end in the positioning data sequence as a point after end; calculating a difference between positioning time of the positioning data with status point after end and positioning time of the positioning data with status point before start to obtain a first time length; calculating, based on a preset speed and a distance between the positioning data with status start and the positioning data with status point before start, a second time length spent from a location corresponding to the positioning data with status point before start to a location corresponding to the positioning data with status start; calculating, based on the preset speed and a distance between the positioning data with status end and the positioning data with status point after end, a third time length spent from a location corresponding to the positioning data with status end to a location corresponding to the positioning data with status point after end; and calculating a sum of the second time length and the third time length, subtracting the calculated sum from the first time length, and using a subtraction result as the dwell time of the user at the target point of interest.

In some embodiments, the visiting data in the visiting data sequence further includes visiting location information; and the determining an effective area of a target point of interest, includes: acquiring visiting location information of a plurality of users at the target point of interest, and location information of the target point of interest; calculating a distance between a location corresponding to the visiting location information of the plurality of users and a location corresponding to the location information of the target point of interest respectively, to obtain a plurality of distances; determining an effective radius of the target point of interest based on the obtained plurality of distances; and determining the effective area of the target point of interest based on the effective radius.

In some embodiments, the determining an effective radius of the target point of interest based on the obtained plurality of distances, includes: performing Gaussian fitting using the plurality of distances to obtain a Gaussian curve; and calculating a standard deviation of the Gaussian curve, and using a preset multiple of the standard deviation as the effective radius.

In a second aspect, an embodiment of the present disclosure provides an apparatus for generating information, including: an acquiring unit, configured to acquire a visiting data sequence and a positioning data sequence of a user, visiting data including visiting time and a point of interest identifier, and positioning data including positioning time and location information; a matching unit, configured to use, in response to determining that the visiting time of the visiting data in the visiting data sequence matches the positioning time of the positioning data in the positioning data sequence, the visiting data corresponding to the matched visiting time as target visiting data, and the positioning data corresponding to the matched positioning time as target positioning data; a determining unit, configured to determine an effective area of a target point of interest, the target point of interest being a point of interest corresponding to a point of interest identifier of the target visiting data; and a first generating unit, configured to determine a dwell time of the user at the target point of interest based on the effective area and the positioning data sequence.

In some embodiments, the apparatus further includes: a second generating unit, configured to generate, based on visiting data sequences and positioning data sequences of a plurality of users, dwell time of users among the plurality of users at the target point of interest to obtain a plurality of dwell time; and a statistical unit, configured to perform statistical analysis on the plurality of dwell time, and output statistical analysis results.

In some embodiments, the first generating unit includes: a subsequence determining unit, configured to determine, based on the effective area and the location information in the positioning data, a positioning data subsequence from the positioning data sequence, where positioning data in the positioning data subsequence is sorted in chronological order; a marking unit, configured to perform status marking on the positioning data in the positioning data subsequence, where marked status includes start, stay, and end; and a dwell time generating unit, configured to determine the dwell time of the user at the target point of interest based on positioning data with status start and positioning data with status end.

In some embodiments, the dwell time generating unit is further configured to: mark a status of a previous positioning data of the positioning data with status start in the positioning data sequence as a point before start, and mark a status of a next positioning data of the positioning data with status end in the positioning data sequence as a point after end; calculate a difference between positioning time of the positioning data with status point after end and positioning time of the positioning data with status point before start to obtain a first time length; calculate, based on a preset speed and a distance between the positioning data with status start and the positioning data with status point before start, a second time length spent from a location corresponding to the positioning data with status point before start to a location corresponding to the positioning data with status start; calculate, based on the preset speed and a distance between the positioning data with status end and the positioning data with status point after end, a third time length spent from a location corresponding to the positioning data with status end to a location corresponding to the positioning data with status point after end; and calculate a sum of the second time length and the third time length, subtract the calculated sum from the first time length, and use a subtraction result as the dwell time of the user at the target point of interest.

In some embodiments, the visiting data in the visiting data sequence further includes visiting location information; and the determining unit includes: an information acquiring unit, configured to acquire visiting location information of a plurality of users at the target point of interest, and location information of the target point of interest; a calculating unit, configured to calculate a distance between a location corresponding to the visiting location information of the plurality of users and a location corresponding to the location information of the target point of interest respectively, to obtain a plurality of distances; a radius determining unit, configured to determine an effective radius of the target point of interest based on the obtained plurality of distances; and an area determining unit, configured to determine the effective area of the target point of interest based on the effective radius.

In some embodiments, the radius determining unit is further configured to: perform Gaussian fitting using the plurality of distances to obtain a Gaussian curve; and calculate a standard deviation of the Gaussian curve, and use a preset multiple of the standard deviation as the effective radius.

In a third aspect, an embodiment of the present disclosure provides a device, including: one or more processors; and a storage apparatus, storing one or more programs thereon, the one or more programs, when executed by the one or more processors, cause the one or more processors to implement the method according to any one of the implementations in the first aspect.

In a fourth aspect, an embodiment of the present disclosure provides a computer readable medium, storing a computer program thereon, the program, when executed by a processor, implements the method according to any one of the implementations in the first aspect.

The method and apparatus for generating information provided by the embodiments of the present disclosure first acquire a visiting data sequence and a positioning data sequence of a user, then use, in response to determining that the visiting time of the visiting data in the visiting data sequence matches the positioning time of the positioning data in the positioning data sequence, the visiting data corresponding to the matched visiting time as target visiting data, and the positioning data corresponding to the matched positioning time as target positioning data, determine an effective area of a target point of interest, and finally determine a dwell time of the user at the target point of interest based on the effective area and the positioning data sequence, thereby automatically generating the dwell time of the user at the target point of interest based on the visiting data sequence and the positioning data sequence, and improving an information generation efficiency.

BRIEF DESCRIPTION OF THE DRAWINGS

After reading detailed descriptions of non-limiting embodiments with reference to the following accompanying drawings, other features, objectives and advantages of the present disclosure will become more apparent.

FIG. 2 is a flowchart of a method for generating information according to an embodiment of the present disclosure;

FIG. 5 is a flowchart of the method for generating information according to another embodiment of the present disclosure;

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
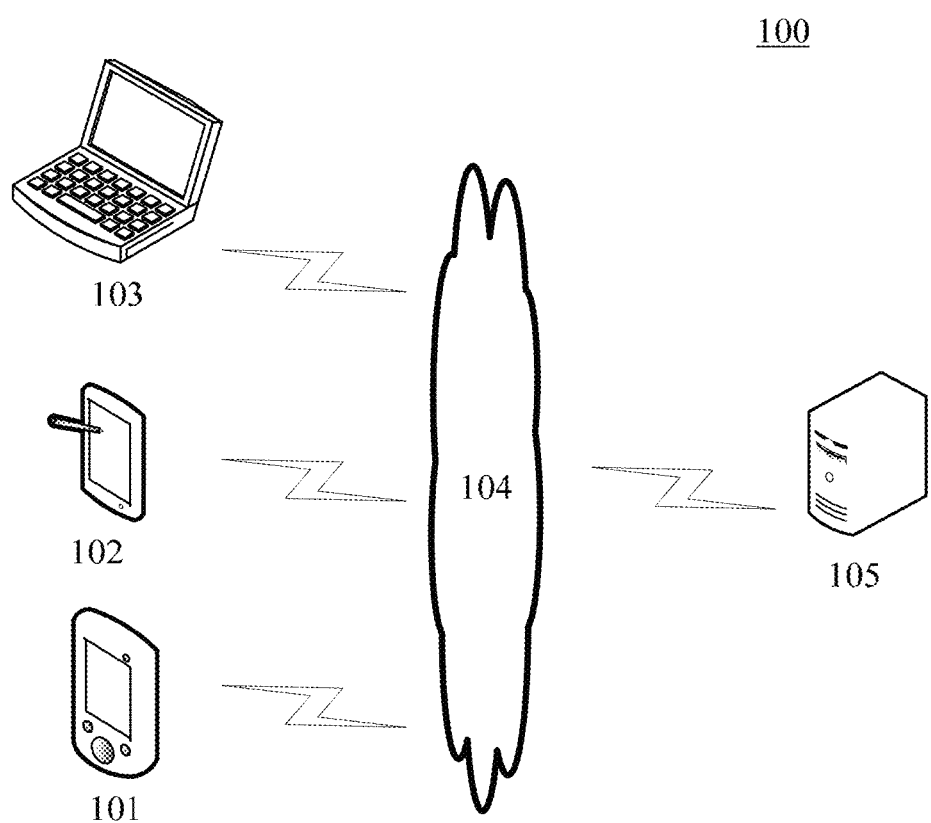
FIG. 1 is an exemplary system architecture diagram to which an embodiment of the present disclosure may be applied.

FIG. 1 illustrates an exemplary system architecture 100 of a method for generating information or an apparatus for generating information to which the embodiments of the present disclosure may be applied.

As shown in FIG. 1, the system architecture 100 may include terminal devices 101, 102, 103, a network 104, and a server 105. The network 104 is used to provide a communication link medium between the terminal devices 101, 102, 103 and the server 105. The network 104 may include various types of connections, such as wired, wireless communication links, or optic fibers.

The user may interact with the server 105 through the network 104 using the terminal devices 101, 102, 103 to receive or send messages and the like. Various communication client applications, such as web browser applications, shopping applications, search applications, social platform software, GPS (Global Positioning System), and the like, may be installed on the terminal devices 101, 102, and 103.

The terminal devices 101, 102, 103 may be hardware or software. When the terminal devices 101, 102, 103 are hardware, they may be various electronic devices having display screens and supporting web browsing, including, but not limited to, smartphones, tablets, laptop portable computers, desktop computers, and the like. When the terminal devices 101, 102, 103 are software, they may be installed in the above-listed electronic devices. They may be implemented as a plurality of pieces of software or a plurality of software modules (for example, software or software modules for providing distributed services) or as a single piece of software or a single software module, which is not specifically limited herein.

The server 105 may be a server that provides various services, such as a background server that processes such as analyze data transmitted on the terminal devices 101, 102, and 103. The background server may process such as analyze data such as received visiting data sequence and positioning data sequence, and send a processing result (for example, the stay duration).

It should be noted that the server 105 may be hardware or software. When the server 105 is hardware, it may be implemented as a distributed server cluster composed of multiple servers, or may be implemented as a single server. When the server 105 is software, it may be implemented as a plurality of pieces of software or a plurality of software modules (for example, software or software modules for providing distributed services), or as a single piece of software or a single software module, which is not specifically limited herein.

It should be noted that the method for generating information provided by the embodiments of the present disclosure may be performed by the terminal devices 101, 102, 103, or may be performed by the server 105. Accordingly, the apparatus for generating information may be disposed in the terminal devices 101, 102, 103, or may be disposed in the server 105, which is not specifically limited herein.

It should be understood that the number of terminal devices, networks, and servers in FIG. 1 is merely illustrative. Depending on the implementation needs, there may be any number of terminal devices, networks, and servers.

With further reference to FIG. 2, a flow 200 of a method for generating information according to an embodiment of the present disclosure is illustrated. The method for generating information includes the following steps.

Step 201, acquiring a visiting data sequence and a positioning data sequence of a user.

In the present embodiment, an executing body of the method for generating information (for example, the terminal devices 101, 102, 103 or the server 105 shown in FIG. 1) may acquire a visiting data sequence and a positioning data sequence of a user in various ways. As an example, when the executing body is a terminal device, the terminal device may acquire the visiting data sequence and the positioning data sequence of the user by receiving an external input. As another example, when the executing body is a server, the server may acquire the visiting data sequence and the positioning data sequence of the user by receiving an external input, and the server may alternatively generate the visiting data sequence and the positioning data sequence based on visiting data and positioning data sent by the terminal used by the user.

Here, the visiting data sequence may include a plurality of visiting data sorted in chronological order, and each visiting data may include visiting time and a point of interest identifier of a visited point of interest. Here, the point of interest identifier may be used to uniquely identify a point of interest. In practice, for each point of interest that the user arrives, the visiting data may be determined by, but not limited to, the following methods: 1) in response to determining that the user uses an electronic wallet to make a payment at the point of interest, it is determined that the user has visited the point of interest, the paying time is the visiting time, and the visiting data is generated using the visiting time and the point of interest identifier of the point of interest; 2) in response to determining that the user uses a group purchase coupon purchased online at the point of interest, it is determined that the user has visited the point of interest, and the time that the user uses the group purchase coupon is the visiting time, and the visiting data is generated using the visiting time and the point of interest identifier of the point of interest; 3) in response to determining that the user accesses to the WiFi set at the point of interest, it is determined that the user has visited the point of interest, the time to access to the WiFi is the visiting time, and the visiting data is generated using the visiting time and the point of interest identifier of the point of interest; or 4) in response to determining that the user performs a check-in operation on an electronic map for the point of interest, since the check-in operation for the point of interest requires the user to arrive at the point of interest to execute, it is determined that the user has visited the point of interest, the execution time of the check-in operation is the visiting time, and the visiting data is generated using the visiting time and the point of interest identifier of the point of interest. For example, the visiting data sequence for the user u may be expressed as follows.

$$S_u=\{S_{u,1}, S_{u,2}, \ldots S_{u,i} \ldots S_{u,m}\}$$

Here, $S_{u,i}=\langle t, \text{POIidentifier}\rangle$ represents the $i_{th}$ ($1 \leq i \leq m$) visiting data. m represents the number of visiting data in the visiting data sequence, t represents the visiting time, and the POI identifier represents the point of interest identifier of the point of interest visited in the visiting time t.

Here, the positioning data sequence may include a plurality of positioning data sorted in chronological order, and each positioning data may include positioning time and location information (e.g., coordinates). In practice, the positioning data may be data collected by the positioning system (e.g., Global Positioning System) of a device carried by the user. For example, the positioning data sequence for the user u may be expressed as follows.

$$P_u=\{P_{u,1}, P_{u,2}, \ldots P_{u,j} \ldots P_{u,l}\}$$

Here, $P_{u,j}=\langle \ln g, \text{lat}, \text{time}\rangle$ represents the $j_{th}$ ($1 \leq j \leq n$) positioning data. n represents the number of positioning data in the positioning data sequence, ln g and lat represent the longitude and latitude of the positioning, and time represents the positioning time.

Step 202, using, in response to determining that the visiting time of the visiting data in the visiting data sequence matches the positioning time of the positioning data in the positioning data sequence, the visiting data corresponding to the matched visiting time as target visiting data, the positioning data corresponding to the matched positioning time as target positioning data.

In the present embodiment, the executing body may match the visiting time of the visiting data in the visiting data sequence with the positioning time of the positioning data in the positioning data sequence, if the visiting time of a certain visiting data in the visiting data sequence is the same as the positioning time of a certain positioning data in the positioning data sequence or the difference thereof is less than a preset threshold, it is determined that the visiting time of the visiting data matches the positioning time of the positioning data. Here, the preset threshold may be a threshold set by those skilled in the art according to actual needs. In response to determining that the visiting time of the visiting data in the visiting data sequence matches the positioning time of the positioning data in the positioning data sequence, the executing body may use the visiting data corresponding to the matched visiting time as target visiting data, use the positioning data corresponding to the matched positioning time as target positioning data.

Step 203, determining an effective area of a target point of interest.

In the present embodiment, the executing body may determine a point of interest corresponding to a point of interest identifier of the target visiting data as a target point of interest. Then, the executing body may determine an effective area of the target point of interest in various ways. As an example, since the positioning time of the target positioning data and the visiting time of the target visiting data are the same or the difference thereof is less than a preset threshold, it may be determined that a location corresponding to the location information of the target positioning data is the same as or close to the location of the target point of interest. Therefore, the effective area may be determined centering on the location corresponding to the location information of the target positioning data. For example, the determined center point is the origin, and an area determined by a preset distance as the radius is used as the effective area of the target point of interest. As another example, the determined center point is the center, and a regular polygon area determined by a preset distance as the side length is used as the effective area of the target point of interest. Here, the preset distance may be a distance set by those skilled in the art according to actual needs.

In some alternative implementations of the present embodiment, the visiting data in the visiting data sequence may further include visiting location information. As an example, the visiting location information in a certain visiting data may refer to the location information of the user collected in the visiting time of the visiting data, for example, the location information may be collected by using GPS or other positioning methods. And the step 203 may be specifically performed as follows.

First, the executing body may acquire visiting location information of a plurality of users at the target point of interest, and location information of the target point of interest. Here, the location information of the target point of interest may be acquired by the executing body in various methods, for example, input from the outside, and as another example, crawled by a web page that is used to introduce the target point of interest.

Secondly, the executing body may calculate a distance between a location corresponding to the visiting location information of the plurality of users and a location corresponding to the location information of the target point of interest respectively, to obtain a plurality of distances.

Then, the executing body may determine an effective radius of the target point of interest based on the obtained plurality of distances. For example, the executing body may determine the average value of the plurality of distances as the effective radius of the target point of interest.

Finally, the executing body may determine the effective area of the target point of interest based on the effective radius. For example, the executing body may use a location corresponding to the location information of the target point of interest as the origin, and an area determined by the effective radius as the radius is used as the effective area of the target point of interest.

In some alternative implementations, the determining an effective radius of the target point of interest based on the obtained plurality of distances, may specifically be performed as follows.

First, the executing body may perform Gaussian fitting using the plurality of distances to obtain a Gaussian curve. It should be noted that the method of performing Gaussian fitting using the plurality of distances to obtain a Gaussian curve is a well-known technique widely studied and applied at present, and detailed description thereof will be omitted.

Then, the executing body may calculate a standard deviation of the Gaussian curve, and use a preset multiple (for example, 3 times) of the standard deviation as the effective radius.

Step 204, determining a dwell time of the user at the target point of interest based on the effective area and the positioning data sequence.

In the present embodiment, the executing body may determine a dwell time of the user at the target point of interest based on the effective area and the positioning data sequence determined in step 203. For example, the executing body may first determine positioning data of a location corresponding to the location information falls into the effective area in the positioning data sequence. After that, the determined at least one positioning data is sorted in chronological order according to the positioning time, and the time difference between the last and the first of the positioning data is used as the dwell time of the user at the target point of interest, which is also the stay duration.

In some alternative implementations of the present embodiment, the step 204 may alternatively specifically be performed as follows.

First, the executing body may determine, based on the effective area and the location information in the positioning data, a positioning data subsequence from the positioning data sequence. Here, positioning data in the positioning data subsequence is sorted in chronological order. For example, the executing body may use the positioning data of the location corresponding to the location information falls into the effective area in the positioning data sequence to form the positioning data subsequence.

Then, the executing body may perform status marking on the positioning data in the positioning data subsequence. Here, marked status includes start, stay, and end. For example, the executing body may mark the first positioning data in the positioning data subsequence as "start", mark the last positioning data as "end", and mark the data between the first and last positioning data as "stay".

Finally, the executing body may determine the dwell time of the user at the target point of interest based on positioning data with status start and positioning data with status end. For example, the executing body may determine the difference between the positioning time of the positioning data with status start and positioning data with status end as the dwell time of the user at the target point of interest.

In some alternative implementations, the determining the dwell time of the user at the target point of interest based on positioning data with status start and positioning data with status end may specifically be performed as follows.

Step S1, marking a status of a previous positioning data of the positioning data with status start in the positioning data sequence as a point before start, and marking a status of a next positioning data of the positioning data with status end in the positioning data sequence as a point after end.

Step S2, calculating a difference between positioning time of the positioning data with status point after end and positioning time of the positioning data with status point before start to obtain a first time length.

Step S3, calculating, based on a preset speed and a distance between the positioning data with status start and the positioning data with status point before start, a second time length spent from a location corresponding to the positioning data with status point before start to a location corresponding to the positioning data with status start. Here, the preset speed may be set by those skilled in the art according to the actual forward speed of a person.

Step S4, calculating, based on a preset speed and a distance between the positioning data with status end and the positioning data with status point after end, a third time length spent from a location corresponding to the positioning data with status end to a location corresponding to the positioning data with status point after end.

Step S5, calculating a sum of the second time length and the third time length, subtracting the calculated sum from the first time length, and using a subtraction result as the dwell time of the user at the target point of interest.

Figure 3:
FIG. 3 is an exemplary diagram for illustrating an implementation of a user's dwell time at a target point of interest.

To illustrate the present implementation more clearly, please refer to FIG. 3. It is assumed that each "●" in FIG. 3 represents a piece of positioning data, S represents that the status of the positioning data is start, E indicates that the status of the positioning data is end, B represents that the status of the positioning data is point before start, and A represents that the status of the positioning data is point after end. Then, the first time length is a difference between the positioning time of the positioning data with the status B and the status A; the second time length is a ratio of a distance between the positions corresponding to the location information of the positioning data with the status S and the status B to a preset speed; the third time length is a ratio of a distance between the positions corresponding to the location information of the positioning data with the status A and the status E to a preset speed. In practice, since the collection of the positioning data is obtained by sampling at a certain time interval, when calculating the dwell time of the user at the target point of interest, it is necessary to consider the positioning data before the user enters the effective area of the target point of interest and the positioning data after the user leaves the effective area of the target point of interest, therefore, the dwell time of the user at the target point of interest calculated by the implementation of the present disclosure is more accurate.

Figure 4:
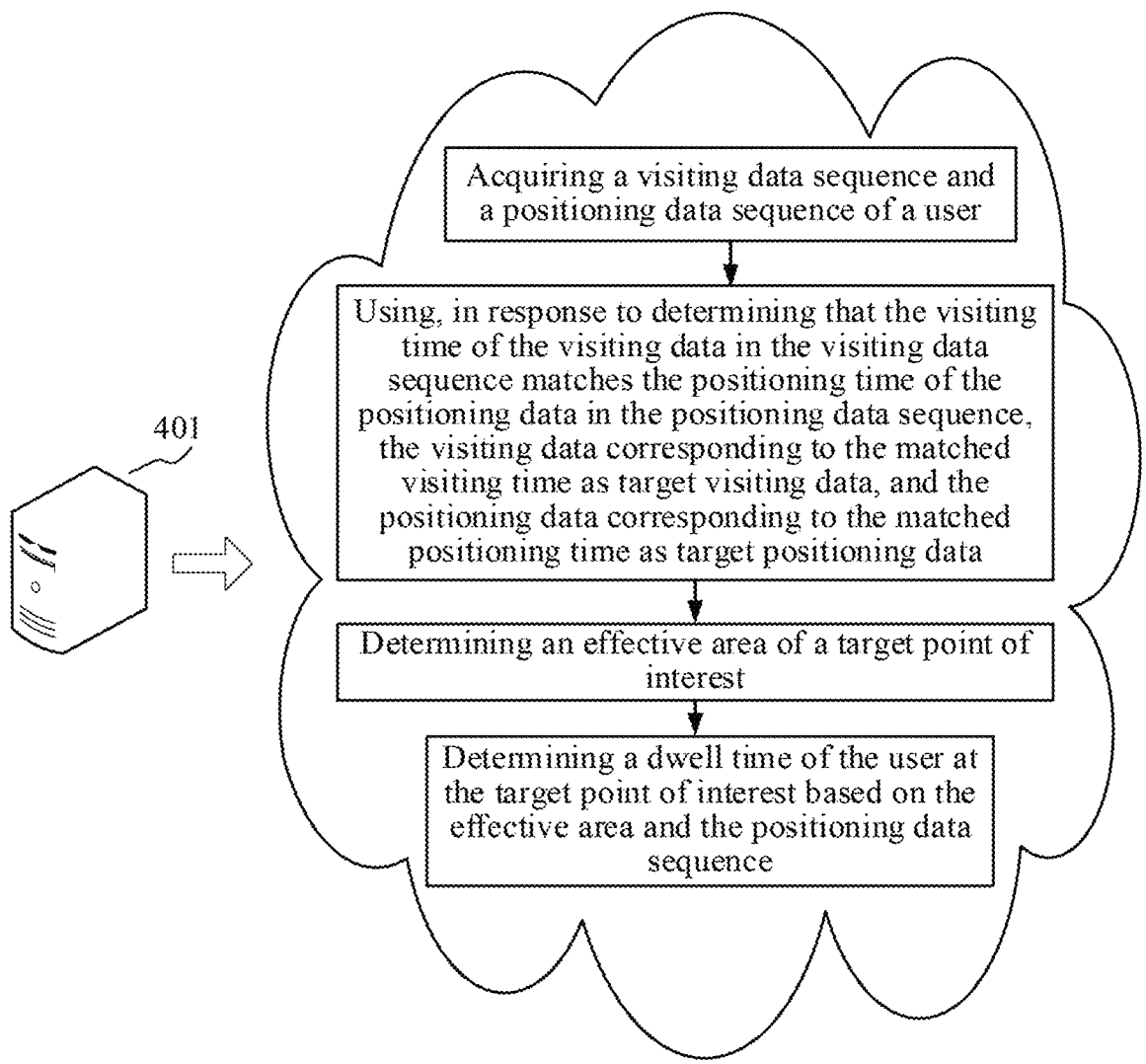
FIG. 4 is a schematic diagram of an application scenario of the method for generating information according to an embodiment of the present disclosure.

With further reference to FIG. 4, FIG. 4 is a schematic diagram of an application scenario of the method for generating information according to the present embodiment. In the application scenario of FIG. 4, a server 401 first acquires a visiting data sequence $\{S_{u,1}, S_{u,2}, \ldots S_{u,i} \ldots S_{u,m}\}$ and a positioning data sequence $\{P_{u,1}, P_{u,2}, \ldots P_{u,j}, \ldots P_{u,j}\}$ of a user u, where visiting data includes visiting time and a point of interest identifier, and positioning data includes positioning time and location information. Then, in response to determining that the visiting time in the visiting data sequence $S_{u,i}$ matches the positioning time in the positioning data sequence $P_{u,j}$, the server 401 may use $S_{u,i}$ as target visiting data, and use $P_{u,j}$ as target positioning data. Then, the server 401 may determine an effective area of the target point of interest, where the target point of interest is a point of interest corresponding to the point of interest identifier of $S_{u,i}$. Finally, the server 401 may determine a dwell time of the user u at the target point of interest based on the effective area and the positioning data sequence $\{P_{u,1}, P_{u,2}, \ldots P_{u,j}, \ldots P_{u,j}\}$.

The method provided by the above embodiments of the present disclosure may automatically generate the dwell time of the user at the target point of interest based on the visiting data sequence and the positioning data sequence. Compared with generating the dwell time of the user at the target point of interest manually, the present embodiments may reduce an information generation cost and improve an information generation efficiency.

With further reference to FIG. 5, FIG. 5 illustrates a flow 500 of another embodiment of the method for generating information. The flow 500 of the method for generating information includes the following steps:

Step 501, acquiring a visiting data sequence and a positioning data sequence of a user.

In the present embodiment, step 501 is similar to step 201 of the embodiment shown in FIG. 2, and repeated description thereof will be omitted.

Step 502, using, in response to determining that the visiting time of the visiting data in the visiting data sequence matches the positioning time of the positioning data in the positioning data sequence, the visiting data corresponding to the matched visiting time as target visiting data, the positioning data corresponding to the matched positioning time as target positioning data.

In the present embodiment, step 502 is similar to step 202 of the embodiment shown in FIG. 2, and repeated description thereof will be omitted.

Step 503, determining an effective area of a target point of interest.

In the present embodiment, step 503 is similar to step 203 of the embodiment shown in FIG. 2, and repeated description thereof will be omitted.

Step 504, determining a dwell time of the user at the target point of interest based on the effective area and the positioning data sequence.

In the present embodiment, step 504 is similar to step 204 of the embodiment shown in FIG. 2, and repeated description thereof will be omitted.

Step 505, generating, based on visiting data sequences and positioning data sequences of a plurality of users, dwell time of users among the plurality of users at the target point of interest to obtain a plurality of dwell time.

In the present embodiment, the executing body may acquire visiting data sequences and positioning data sequences of a plurality of users, and generate dwell time of the plurality of users at the target point of interest to obtain a plurality of dwell time based on the method described in steps 501-504. It should be noted that the visiting data sequence of each of the plurality of users includes at least one visiting data, and a certain visiting data of the at least one visiting data includes the point of interest identifier corresponding to the target point of interest, and the visiting time of the visiting data matches the positioning time of the positioning data in the positioning data sequence corresponding to the user.

Step 506, performing statistical analysis on the plurality of dwell time, and outputting statistical analysis results.

Figure 6:
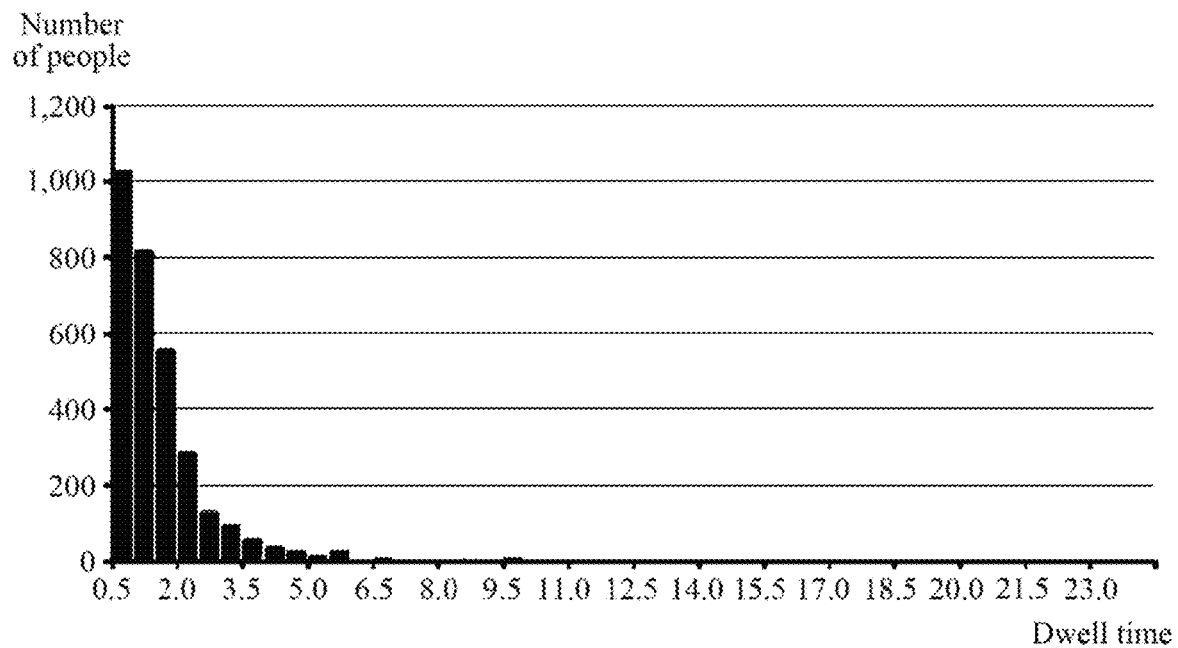
FIG. 6 is an exemplary diagram for displaying statistical analysis results.

In the present embodiment, the executing body may perform statistical analysis on the plurality of dwell time obtained in step 505, and output statistical analysis results. For example, output to a specified device, or output to a display device for display. The display form of the statistical analysis results may include a plurality of types. Taking the histogram as an example, FIG. 6 is a graph showing statistical analysis results of dwell time of 3070 users at the railway station, taking a certain railway station as the target point of interest. The abscissa of the figure represents the dwell time, and the ordinate represents the number of people.

As can be seen from FIG. 5, the flow 500 of the method for generating information in the present embodiment highlights the step of generating the dwell time of the plurality of users at the target point of interest, and performing statistical analysis on the plurality of dwell time. Therefore, the technical solution described in the present embodiment may comprehensively analyze the dwell time of a plurality of users at the target point of interest, thereby making the generated dwell time for the target point of interest more accurate.

Figure 7:
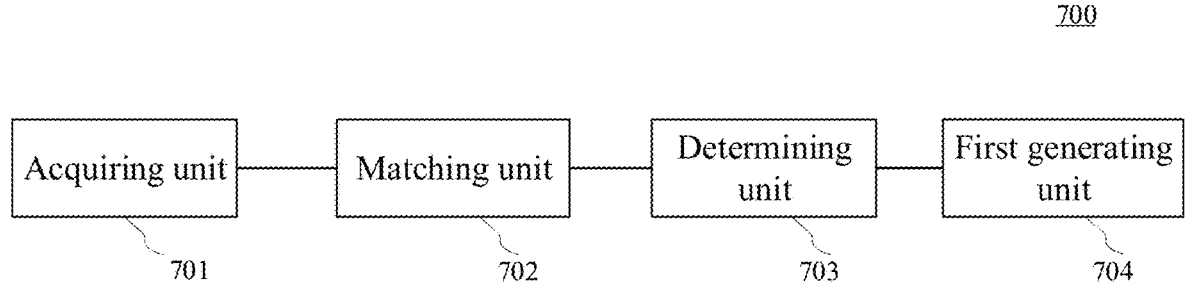
FIG. 7 is a schematic structural diagram of an apparatus for generating information according to an embodiment of the present disclosure.

With further reference to FIG. 7, as an implementation of the method shown in the above figures, an embodiment of the present disclosure provides an apparatus for generating information, the apparatus embodiment corresponds to the method embodiment as shown in FIG. 2, and the apparatus may be specifically applied to various electronic devices.

As shown in FIG. 7, the apparatus 700 for generating information of the present embodiment includes: an acquiring unit 701, a matching unit 702, a determining unit 703 and a first generating unit 704. The acquiring unit 701 is configured to acquire a visiting data sequence and a positioning data sequence of a user, visiting data including visiting time and a point of interest identifier, and positioning data including positioning time and location information. The matching unit 702 is configured to use, in response to determining that the visiting time of the visiting data in the visiting data sequence matches the positioning time of the positioning data in the positioning data sequence, the visiting data corresponding to the matched visiting time as target visiting data, and the positioning data corresponding to the matched positioning time as target positioning data. The determining unit 703 is configured to determine an effective area of a target point of interest, the target point of interest being a point of interest corresponding to a point of interest identifier of the target visiting data. The first generating unit 704 is configured to determine a dwell time of the user at the target point of interest based on the effective area and the positioning data sequence.

In the present embodiment, the specific processing and the technical effects thereof of the acquiring unit 701, the matching unit 702, the determining unit 703 and the first generating unit 704 of the apparatus 700 for generating information may be respectively referred to the related descriptions of step 201, step 202, step 203 and step 204 in the corresponding embodiment of FIG. 2, and repeated description thereof will be omitted.

In some alternative implementations of the present embodiment, the apparatus 700 further includes: a second generating unit (not shown in the figure), configured to generate, based on visiting data sequences and positioning data sequences of a plurality of users, dwell time of users among the plurality of users at the target point of interest to obtain a plurality of dwell time; and a statistical unit (not shown in the figure), configured to perform statistical analysis on the plurality of dwell time, and output statistical analysis results.

In some alternative implementations of the present embodiment, the first generating unit 704 includes: a subsequence determining unit (not shown in the figure), configured to determine, based on the effective area and the location information in the positioning data, a positioning data subsequence from the positioning data sequence, where positioning data in the positioning data subsequence is sorted in chronological order; a marking unit (not shown in the figure), configured to perform status marking on the positioning data in the positioning data subsequence, where marked status includes start, stay, and end; and a dwell time generating unit (not shown in the figure), configured to determine the dwell time of the user at the target point of interest based on positioning data with status start and positioning data with status end.

In some alternative implementations of the present embodiment, the dwell time generating unit is further configured to: mark a status of a previous positioning data of the positioning data with status start in the positioning data sequence as a point before start, and mark a status of a next positioning data of the positioning data with status end in the positioning data sequence as a point after end; calculate a difference between positioning time of the positioning data with status point after end and positioning time of the positioning data with status point before start to obtain a first time length; calculate, based on a preset speed and a distance between the positioning data with status start and the positioning data with status point before start, a second time length spent from a location corresponding to the positioning data with status point before start to a location corresponding to the positioning data with status start; calculate, based on the preset speed and a distance between the positioning data with status end and the positioning data with status point after end, a third time length spent from a location corresponding to the positioning data with status end to a location corresponding to the positioning data with status point after end; and calculate a sum of the second time length and the third time length, subtract the calculated sum from the first time length, and use a subtraction result as the dwell time of the user at the target point of interest.

In some alternative implementations of the present embodiment, the visiting data in the visiting data sequence further includes visiting location information; and the determining unit 703 includes: an information acquiring unit (not shown in the figure), configured to acquire visiting location information of a plurality of users at the target point of interest, and location information of the target point of interest; a calculating unit (not shown in the figure), configured to calculate a distance between a location corresponding to the visiting location information of the plurality of users and a location corresponding to the location information of the target point of interest respectively, to obtain a plurality of distances; a radius determining unit (not shown in the figure), configured to determine an effective radius of the target point of interest based on the obtained plurality of distances; and an area determining unit (not shown in the figure), configured to determine the effective area of the target point of interest based on the effective radius.

In some alternative implementations of the present embodiment, the radius determining unit is further configured to: perform Gaussian fitting using the plurality of distances to obtain a Gaussian curve; and calculate a standard deviation of the Gaussian curve, and use a preset multiple of the standard deviation as the effective radius.

Figure 8:
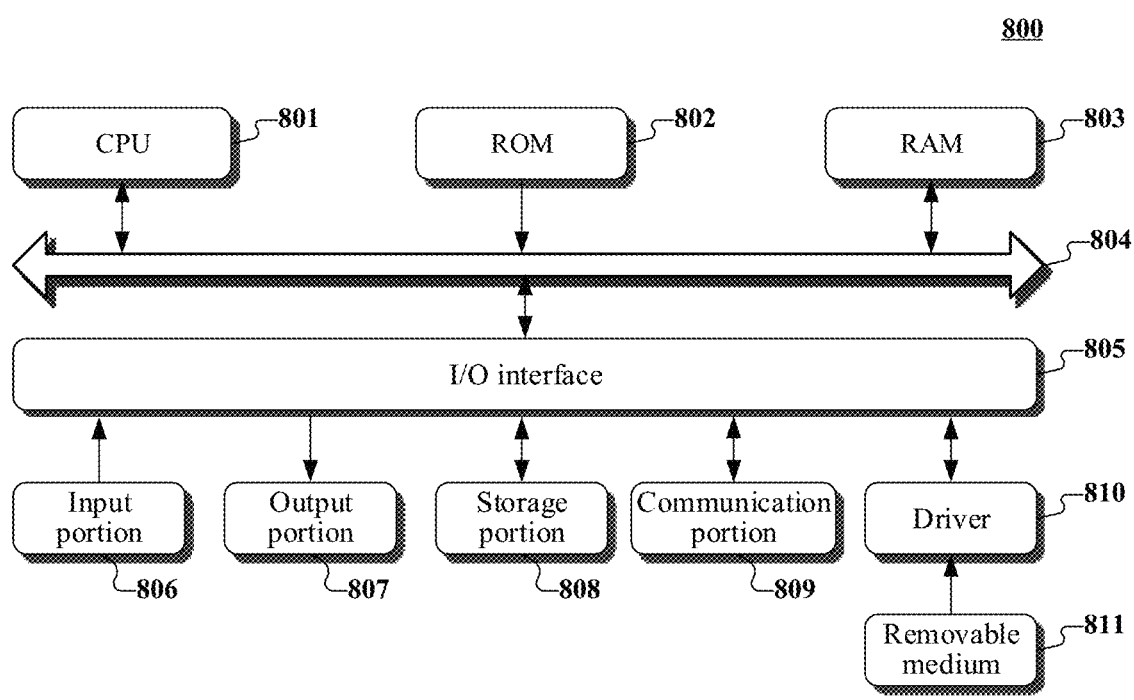
FIG. 8 is a schematic structural diagram of a computer system adapted to implement a device of the embodiments of the present disclosure.

With further reference to FIG. 8, a schematic structural diagram of a computer system 800 adapted to implement a device of the embodiments of the present disclosure is shown. The device shown in FIG. 8 is merely an example, and should not impose any limitation on the function and scope of use of the embodiments of the present disclosure.

As shown in FIG. 8, the computer system 800 includes a central processing unit (CPU) 801, which may execute various appropriate actions and processes in accordance with a program stored in a read-only memory (ROM) 802 or a program loaded into a random access memory (RAM) 803 from a storage portion 808. The RAM 803 also stores various programs and data required by operations of the system 800. The CPU 801, the ROM 802 and the RAM 803 are connected to each other through a bus 804. An input/output (I/O) interface 805 is also connected to the bus 804.

The following components are connected to the I/O interface 805: an input portion 806 including a keyboard, a mouse, etc.; an output portion 807 including such as a cathode ray tube (CRT), a liquid crystal display device (LCD), a speaker, etc.; a storage portion 808 including a hard disk and the like; and a communication portion 809 including a network interface card, such as a LAN card and a modem. The communication portion 809 performs communication processes via a network, such as the Internet. A driver 810 is also connected to the I/O interface 805 as required. A removable medium 811, such as a magnetic disk, an optical disk, a magneto-optical disk, and a semiconductor memory, may be installed on the driver 810 as needed, to facilitate the retrieval of a computer program from the removable medium 811, and the installation thereof on the storage portion 808 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 809, and/or may be installed from the removable medium 811. The computer program, when executed by the central processing unit (CPU) 801, implements the above mentioned functionalities as defined by the method of the embodiments of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functionalities and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including an acquiring unit, a matching unit, a determining unit and a first generating unit. Here, the names of these units do not in some cases constitute limitations to such units themselves. For example, the acquiring unit may also be described as "a unit for acquiring a visiting data sequence and a positioning data sequence of a user".

In another aspect, the present disclosure further provides a computer readable medium. The computer readable medium may be included in the apparatus in the above described embodiments, or a stand-alone computer readable medium not assembled into the apparatus. The computer readable medium carries one or more programs. The one or more programs, when executed by the apparatus, cause the apparatus to: acquire a visiting data sequence and a positioning data sequence of a user, visiting data including visiting time and a point of interest identifier, and positioning data including positioning time and location information; use, in response to determining that the visiting time of the visiting data in the visiting data sequence matches the positioning time of the positioning data in the positioning data sequence, the visiting data corresponding to the matched visiting time as target visiting data, and the positioning data corresponding to the matched positioning time as target positioning data; determine an effective area of a target point of interest, the target point of interest being a point of interest corresponding to a point of interest identifier of the target visiting data; and determine a dwell time of the user at the target point of interest based on the effective area and the positioning data sequence.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for generating information, the method comprising:
    acquiring a visiting data sequence and a positioning data sequence of a user, wherein the visiting data sequence comprises a plurality of pieces of visiting data sorted in chronological order, and the positioning data sequence comprises a plurality of pieces of positioning data sorted in chronological order, each piece of visiting data comprising a visiting time and a point of interest identifier, and each piece of positioning data comprising a positioning time and location information;
    using, in response to determining that the visiting time of a piece of visiting data in the visiting data sequence matches the positioning time of a piece of positioning data in the positioning data sequence, the piece of visiting data corresponding to the matched visiting time as target visiting data, and the piece of positioning data corresponding to the matched positioning time as target positioning data;
    determining an effective area of a target point of interest, the target point of interest being a point of interest corresponding to a point of interest identifier of the target visiting data; and
    determining a dwell time of the user at the target point of interest based on the effective area and the positioning data sequence.

2. The method according to claim 1, wherein the method further comprises:
    generating, based on visiting data sequences and positioning data sequences of a plurality of users, dwell time of users among the plurality of users at the target point of interest to obtain a plurality of dwell times; and
    performing statistical analysis on the plurality of dwell time, and outputting statistical analysis results.

3. The method according to claim 1, wherein the determining the dwell time of the user at the target point of interest based on the effective area and the positioning data sequence, comprises:
    determining, based on the effective area and the location information in the piece of positioning data, a positioning data subsequence from the positioning data sequence, wherein positioning data in the positioning data subsequence is sorted in chronological order;
    performing status marking on the piece of positioning data in the positioning data subsequence, wherein marked status comprises start, stay, and end; and
    determining the dwell time of the user at the target point of interest based on positioning data with status start and positioning data with status end.

4. The method according to claim 3, wherein the determining the dwell time of the user at the target point of interest based on positioning data with status start and positioning data with status end, comprises:
    marking a status of a previous piece of positioning data of the piece of positioning data with status start in the positioning data sequence as a point before start, and marking a status of a next piece of positioning data of the piece of positioning data with status end in the positioning data sequence as a point after end;
    calculating a difference between positioning time of the piece of positioning data with status point after end and positioning time of the piece of positioning data with status point before start to obtain a first time length;
    calculating, based on a preset speed and a distance between the piece of positioning data with status start and the piece of positioning data with status point before start, a second time length spent from a location corresponding to the piece of positioning data with status point before start to a location corresponding to the piece of positioning data with status start;

calculating, based on the preset speed and a distance between the piece of positioning data with status end and the piece of positioning data with status point after end, a third time length spent from a location corresponding to the piece of positioning data with status end to a location corresponding to the piece of positioning data with status point after end; and calculating a sum of the second time length and the third time length, subtracting the calculated sum from the first time length, and using a subtraction result as the dwell time of the user at the target point of interest.

5. The method according to claim 1, wherein the plurality of pieces of visiting data in the visiting data sequence further comprises visiting location information, and wherein the determining the effective area of the target point of interest, comprises:

acquiring visiting location information of a plurality of users at the target point of interest, and location information of the target point of interest;

calculating a distance between a location corresponding to the visiting location information of the plurality of users and a location corresponding to the location information of the target point of interest respectively, to obtain a plurality of distances;

determining an effective radius of the target point of interest based on the obtained plurality of distances; and determining the effective area of the target point of interest based on the effective radius.

6. The method according to claim 5, wherein the determining the effective radius of the target point of interest based on the obtained plurality of distances, comprises:

performing Gaussian fitting using the plurality of distances to obtain a Gaussian curve; and calculating a standard deviation of the Gaussian curve, and using a preset multiple of the standard deviation as the effective radius.

7. An apparatus for generating information, the apparatus comprising:

at least one processor; and a memory storing instructions, wherein the instructions when executed by the at least one processor, cause the at least one processor to perform operations, the operations comprising:

acquiring a visiting data sequence and a positioning data sequence of a user, wherein the visiting data sequence comprises a plurality of pieces of visiting data sorted in chronological order, and the positioning data sequence comprises a plurality of pieces of positioning data sorted in chronological order, each piece of visiting data comprising a visiting time and a point of interest identifier, and each piece of positioning data comprising a positioning time and location information;

using, in response to determining that the visiting time of a piece of visiting data in the visiting data sequence matches the positioning time of a piece of positioning data in the positioning data sequence, the piece of visiting data corresponding to the matched visiting time as target visiting data, and the piece of positioning data corresponding to the matched positioning time as target positioning data;

determining an effective area of a target point of interest, the target point of interest being a point of interest corresponding to a point of interest identifier of the target visiting data; and determining a dwell time of the user at the target point of interest based on the effective area and the positioning data sequence.

8. The apparatus according to claim 7, wherein the operations further comprise:

generating, based on visiting data sequences and positioning data sequences of a plurality of users, dwell time of users among the plurality of users at the target point of interest to obtain a plurality of dwell times; and performing statistical analysis on the plurality of dwell time, and output statistical analysis results.

9. The apparatus according to claim 7, wherein the determining a dwell time of the user at the target point of interest based on the effective area and the positioning data sequence, comprises:

determining, based on the effective area and the location information in the piece of positioning data, a positioning data subsequence from the positioning data sequence, wherein positioning data in the positioning data subsequence is sorted in chronological order;

performing status marking on the piece of positioning data in the positioning data subsequence, wherein marked status comprises start, stay, and end; and determining the dwell time of the user at the target point of interest based on positioning data with status start and positioning data with status end.

10. The apparatus according to claim 9, wherein the determining the dwell time of the user at the target point of interest based on positioning data with the status start and positioning data with status end, comprises:

marking a status of a previous piece of positioning data of the piece of positioning data with status start in the positioning data sequence as a point before start, and marking a status of a next piece of positioning data of the piece of positioning data with status end in the positioning data sequence as a point after end;

calculating a difference between piece of positioning time of the positioning data with status point after end and positioning time of the piece of positioning data with status point before start to obtain a first time length;

calculating, based on a preset speed and a distance between the piece of positioning data with status start and the piece of positioning data with status point before start, a second time length spent from a location corresponding to the piece of positioning data with status point before start to a location corresponding to the piece of positioning data with status start;

calculating, based on the preset speed and a distance between the piece of positioning data with status end and the piece of positioning data with status point after end, a third time length spent from a location corresponding to the piece of positioning data with status end to a location corresponding to the piece of positioning data with status point after end; and calculating a sum of the second time length and the third time length, subtract the calculated sum from the first time length, and use a subtraction result as the dwell time of the user at the target point of interest.

11. The apparatus according to claim 7, wherein the plurality of pieces of visiting data in the visiting data sequence further comprises visiting location information, and wherein the determining the effective area of the target point of interest, comprises:

acquiring visiting location information of a plurality of users at the target point of interest, and location information of the target point of interest;

calculating a distance between a location corresponding to the visiting location information of the plurality of users and a location corresponding to the location information of the target point of interest respectively, to obtain a plurality of distances;

determining an effective radius of the target point of interest based on the obtained plurality of distances; and determining the effective area of the target point of interest based on the effective radius.

12. The apparatus according to claim 11, wherein the determining the effective radius of the target point of interest based on the obtained plurality of distances, comprises:

performing Gaussian fitting using the plurality of distances to obtain a Gaussian curve; and calculating a standard deviation of the Gaussian curve, and using a preset multiple of the standard deviation as the effective radius.

13. A non-transitory computer readable medium, storing a computer program thereon, the computer program, when executed by a processor, causes the processor to perform operations, the operations comprising:

acquiring a visiting data sequence and a positioning data sequence of a user, wherein the visiting data sequence comprises a plurality of pieces of visiting data sorted in chronological order, and the positioning data sequence comprises a plurality of pieces of positioning data sorted in chronological order, each piece of visiting data comprising a visiting time and a point of interest identifier, and each piece of positioning data comprising a positioning time and location information;

using, in response to determining that the visiting time of a piece of visiting data in the visiting data sequence matches the positioning time of a piece of positioning data in the positioning data sequence, the piece of visiting data corresponding to the matched visiting time as target visiting data, and the piece of positioning data corresponding to the matched positioning time as target positioning data;

determining an effective area of a target point of interest, the target point of interest being a point of interest corresponding to a point of interest identifier of the target visiting data; and determining a dwell time of the user at the target point of interest based on the effective area and the positioning data sequence.

14. The non-transitory computer readable medium according to claim 13, wherein the operations further comprise:

generating, based on visiting data sequences and positioning data sequences of a plurality of users, dwell time of users among the plurality of users at the target point of interest to obtain a plurality of dwell times; and performing statistical analysis on the plurality of dwell time, and outputting statistical analysis results.

15. The non-transitory computer readable medium according to claim 13, wherein the determining the dwell time of the user at the target point of interest based on the effective area and the positioning data sequence, comprises:

determining, based on the effective area and the piece of location information in the positioning data, a positioning data subsequence from the positioning data sequence, wherein positioning data in the positioning data subsequence is sorted in chronological order;

performing status marking on the piece of positioning data in the positioning data subsequence, wherein marked status comprises start, stay, and end; and determining the dwell time of the user at the target point of interest based on positioning data with status start and positioning data with status end.

16. The non-transitory computer readable medium according to claim 15, wherein the determining the dwell time of the user at the target point of interest based on positioning data with the status start and positioning data with status end, comprises:

marking a status of a previous piece of positioning data of the piece of positioning data with status start in the positioning data sequence as a point before start, and marking a status of a next piece of positioning data of the piece of positioning data with status end in the positioning data sequence as a point after end;

calculating a difference between positioning time of the piece of positioning data with status point after end and positioning time of the piece of positioning data with status point before start to obtain a first time length;

calculating, based on a preset speed and a distance between the piece of positioning data with status start and the piece of positioning data with status point before start, a second time length spent from a location corresponding to the positioning data with status point before start to a location corresponding to the piece of positioning data with status start;

calculating, based on the preset speed and a distance between the piece of positioning data with status end and the piece of positioning data with status point after end, a third time length spent from a location corresponding to the piece of positioning data with status end to a location corresponding to the piece of positioning data with status point after end; and calculating a sum of the second time length and the third time length, subtracting the calculated sum from the first time length, and using a subtraction result as the dwell time of the user at the target point of interest.

17. The non-transitory computer readable medium according to claim 13, wherein the plurality of pieces of visiting data in the visiting data sequence further comprises visiting location information, and wherein the determining the effective area of the target point of interest, comprises:

acquiring visiting location information of a plurality of users at the target point of interest, and location information of the target point of interest;

calculating a distance between a location corresponding to the visiting location information of the plurality of users and a location corresponding to the location information of the target point of interest respectively, to obtain a plurality of distances;

determining an effective radius of the target point of interest based on the obtained plurality of distances; and determining the effective area of the target point of interest based on the effective radius.

18. The non-transitory computer readable medium according to claim 17, wherein the determining the effective radius of the target point of interest based on the obtained plurality of distances, comprises:

performing Gaussian fitting using the plurality of distances to obtain a Gaussian curve; and calculating a standard deviation of the Gaussian curve, and using a preset multiple of the standard deviation as the effective radius.

* * * * *